United States Patent [19]

Beale et al.

[11] Patent Number: 4,709,365
[45] Date of Patent: Nov. 24, 1987

[54] DATA TRANSMISSION SYSTEM AND METHOD

[75] Inventors: Nicholas C. L. Beale, Wraysbury, Nr Staines, England; Roger W. Rushbrooke, Beaconsfield, New Zealand; Philip J. S. Gladstone, Newbury, England

[73] Assignee: Beale International Technology Limited, England

[21] Appl. No.: 755,328

[22] PCT Filed: Oct. 31, 1984

[86] PCT No.: PCT/GB84/00366

§ 371 Date: Jun. 28, 1985

§ 102(e) Date: Jun. 28, 1985

[87] PCT Pub. No.: WO85/02078

PCT Pub. Date: May 9, 1985

[30] Foreign Application Priority Data

Oct. 31, 1983 [GB] United Kingdom ............... 8328978
Jul. 13, 1984 [GB] United Kingdom ............... 8417906

[51] Int. Cl.[4] .............................................. G06F 11/16
[52] U.S. Cl. ........................................ 371/11; 370/16
[58] Field of Search ................ 371/8, 11; 370/16, 14, 370/86, 88; 364/200, 900

[56] References Cited

U.S. PATENT DOCUMENTS

| 3,876,983 | 4/1975 | Safiropulo et al. | 371/11 X |
|---|---|---|---|
| 4,009,469 | 2/1977 | Boudreau et al. | 371/8 X |
| 4,159,470 | 6/1979 | Strojny et al. | 371/11 X |
| 4,186,380 | 1/1980 | Edwin et al. | 371/11 |
| 4,354,267 | 10/1982 | Mori et al. | 371/11 |
| 4,365,247 | 12/1982 | Bargeton et al. | 371/8 X |
| 4,390,984 | 6/1983 | Sugiura et al. | 370/88 |
| 4,527,270 | 7/1985 | Sweeton | 371/11 |
| 4,538,264 | 8/1985 | Bahr et al. | 371/8 |
| 4,594,709 | 6/1986 | Yasue | 371/8 |

OTHER PUBLICATIONS

H. Ihara et al., Highly Reliable Loop Computer Network System Based on Autonomous Decentralization Concept, 12th Annual Intl. Symposium, Fault Tolerant Computing, Santa Morica, Jun. 22-24, 1982, pp. 187-194.

Primary Examiner—Charles E. Atkinson
Attorney, Agent, or Firm—Silverman, Cass, Singer and Windburn, Ltd.

[57] ABSTRACT

A data transmission system comprising a plurality of reconfiguring devices (1-6) and a method of reconfiguring such devices. Each device (1-6) has a plurality of input and output data links (9-12), the devices being connected in a ring (18) whereby for each reconfiguring device data is received on one data input link (9) and transferred to one data output link (11) such that data may be passed between all the reconfiguring devices along the ring. Each device includes fault recovery means for detecting the presence of a fault in the ring, the fault recovery means (7) in different devices cooperating to attempt to cause data to be transmitted around a sub-ring when a fault is detected, the sub-ring being constituted at least partially by one or more of the previously unused data links (10, 12) to enable a number of the devices (1-6) to continue to communicate; and merging means (7) for detecting that a new reconfiguring device is connected to at least one pair of previously unused data input and output links and for reconfiguring the ring to include the new device.

15 Claims, 13 Drawing Figures

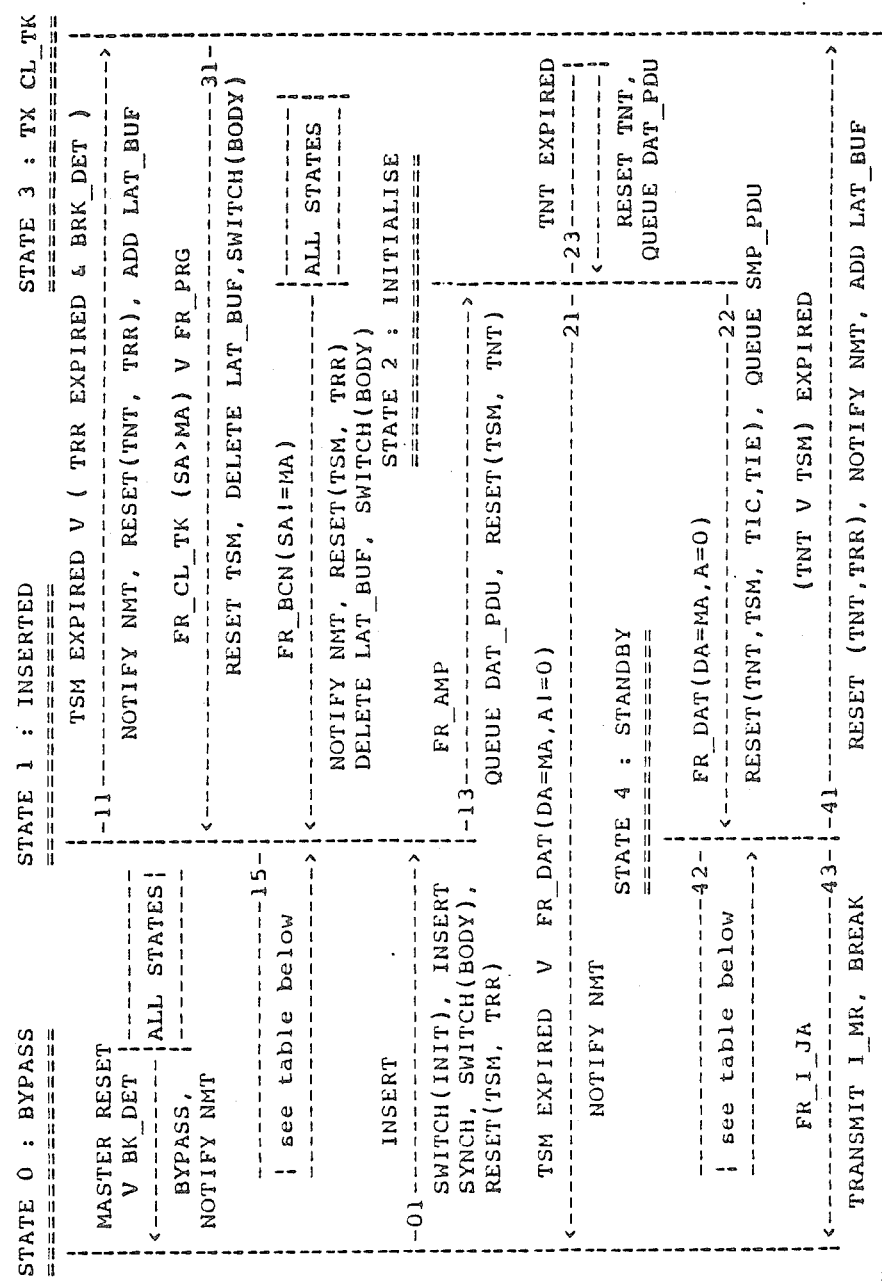
Fig. 9. (part 1)

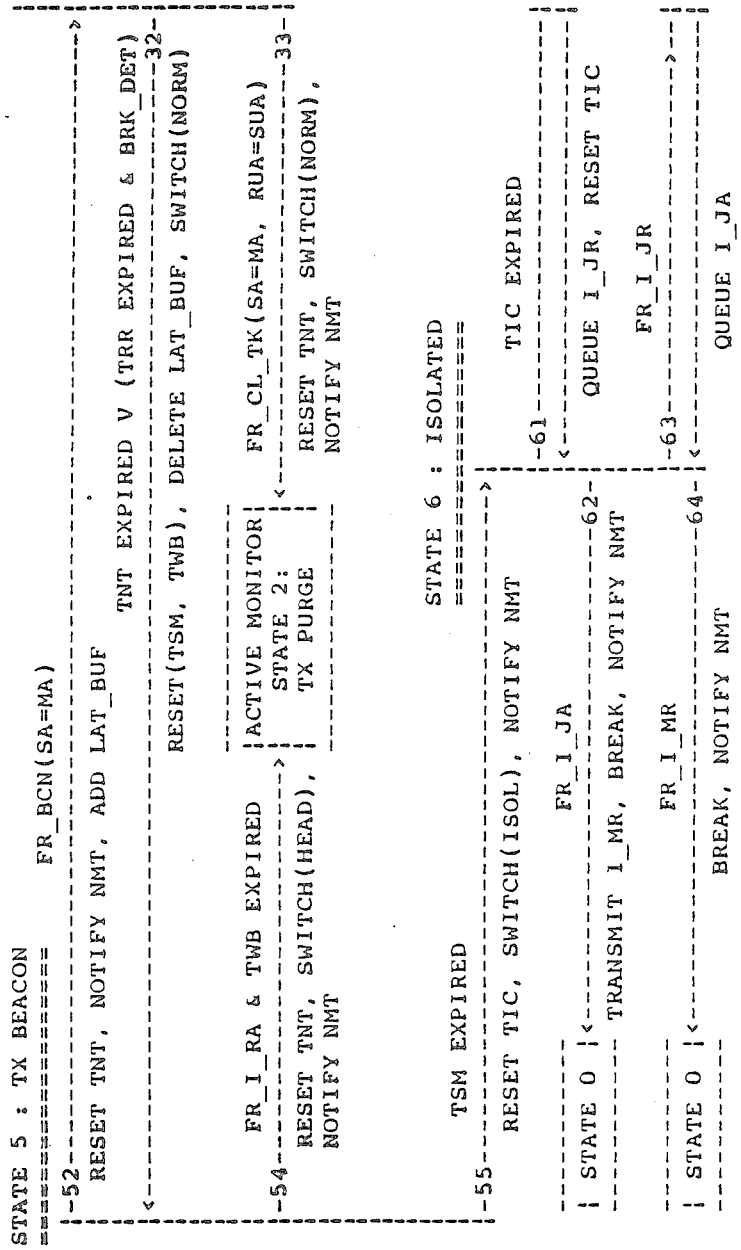
Fig. 9. (part 2)

Fig. 9. (part 3)

STANDBY MONITOR TRANSITION 15 TABLE.

| REF | EVENT | ACTION |
|---|---|---|
| 15A | FR_BCN | RESET TWT, SWITCH (NORM), TRANSMIT I_RA. |
| 15B | FR_I_RA | SWITCH (BODY) |
| 15C | FR_CL_TK | SWITCH (BODY) |
| 15D | NORM & TWT EXPIRED | SWITCH (TAIL) |

STANDBY MONITOR TRANSITION 42 TABLE.

| REF | EVENT | ACTION |
|---|---|---|
| 42B | FR_CL_TK V FR_PRG V TOKEN | RESET TNT |
| 42C | FR_SMP(A,C=0) | RESET TQP |
| 42D | FR_AMP(A,C=0) | RESET (TQP,TSM) |
| 42E | FR_AMP(A,CI=0) | RESET TSM |
| 42F | TQP EXPIRED | QUEUE SMP_PDU |
| 42G | NORM & FR_I_CHK | RESET TIE |
| 42H | NORM & TIC EXPIRED | QUEUE I_CHK, RESET TIC |
| 42I | NORM & TIE EXPIRED | NOTIFY NMT, RESET TIE |
| 42J | BODY & FR_I_CHK | SWITCH (NORM), RESET(TIC,TIE) |
| 42K | BODY & (TIE V TIC) EXPIRED | none |
| 42L | TAIL & TIC EXPIRED | QUEUE I_JR, RESET TIC |
| 42M | TAIL & TIE EXPIRED | none |

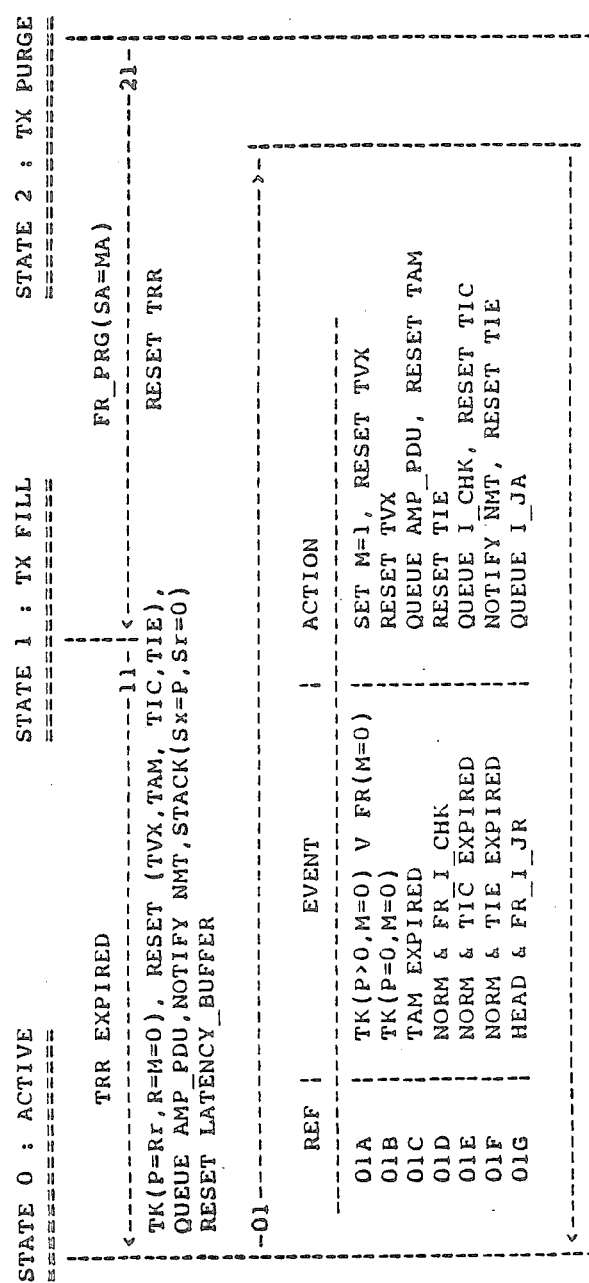
Fig. 10. (part 1)

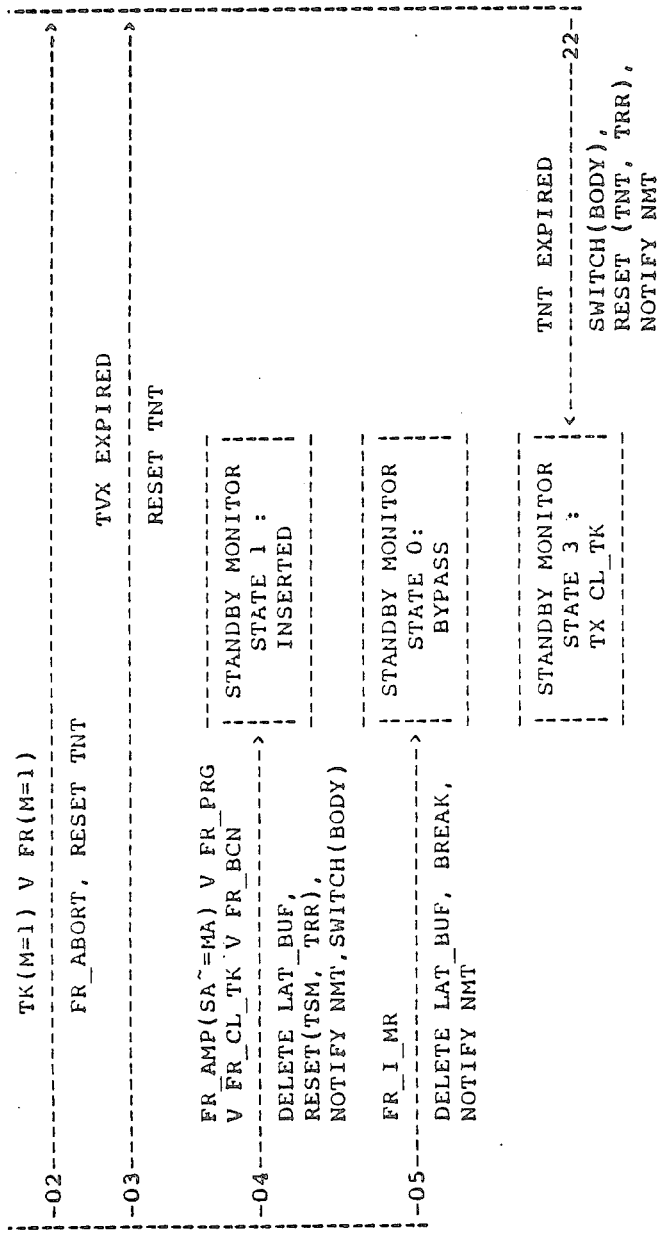
Fig. 10. (part 2)

DATA TRANSMISSION SYSTEM AND METHOD

BACKGROUND OF THE INVENTION

The invention relates to a data transmission system comprising a plurality of reconfiguring devices, each device having a plurality of input and output data links, the devices being connected in a ring whereby for each reconfiguring device data is received on one data input link and transferred to one data output link such that data may be passed between all the reconfiguring devices along the ring. The invention also relates to a method of operating a reconfiguring device forming part of such a data transmission system.

The invention is particularly applicable to local area networks. Local area networks are described in an article entitled "An Introduction to Local Area Networks" by David Clark, Kenneth Pogran, and David Reed in Proceedings of the IEEE, Volume 66, No. 11, pages 1497-1517. These data transmission systems enable a number of data processing devices, for example microprocessors, to communicate with each other at high speeds over distances typically in the range 10 to 10,000 meters. The system may include both the reconfiguring devices mentioned above which will have a plurality of input and output data links and one or more non-reconfiguring devices hereinafter referred to as "single link pair" devices which have a single data input link and a single data output link. Each of the devices may provide an interface between the associated data processing device or devices and the ring or provide a network function. It should be understood that the data links referred to allow the devices to communicate with a ring. Additional links are provided to connect each device to one or more host devices.

One advantage of a ring over other topologies is that the protocols which organise the transmission of data around the ring can be a fairly simple nature. By comparison with packet switching techniques these have the advantage that as data arrives at each device it is not necessary to decide to where it must be routed since it is simply passed from the one data input link to the one data output link. The only decision, during normal use, that a device has to make is whether the data is addressed to it in which case it must be read.

One of the problems with a ring topology arises on the occurrence of a fault since in theory this could cause complete break down of the transmission system. Some prior proposals have been made to deal with this problem.

No. GB-A-1,570,923 discloses a transmission system arranged in a ring topology in which there are additional connections between some of the stations in the ring so that if a fault should occur it can easily be bypassed using the second connection. The problem with this arrangement is that these special stations need to determine the destination of data since there will be a choice of paths for the data to take and a number of the other stations will be bypassed.

No. EP-A-0074672 and No. GB-A-2114858 disclose so-called dual ring arrangements in which a number of stations are connected together in series by a pair of communication channels which enable data to be transmitted in opposite directions between the stations. Data is normally transmitted in one direction around the ring along a set of primary channels. If a fault occurs then any one of the stations can cause data to transfer from a primary channel to an auxiliary channel so that a sub-ring can be built up allowing the fault to be bypassed. Although these arrangements allow the integrity of the ring to be at least partially maintained despite the development of a fault they do not provide a simple method for allowing the original ring to be reconfigured once the fault has be cured.

SUMMARY OF THE INVENTION

In accordance with one aspect of the present invention, a data transmission system comprises a plurality of reconfiguring devices, each device having a plurality of input and output data links, the devices being connected in a ring whereby for each reconfiguring device data is received on the data input link and transferred to one data output link such that data may be passed between all the reconfiguring devices along the ring, wherein each device includes fault recovery means for detecting the presence of a fault in the ring, the fault recovery means in different devices cooperating to attempt to cause data to be transmitted around a sub-ring when a fault is detected, the sub-ring being constituted at least partially by one or more of the previously unused data links to enable a number of the devices to continue to communicate; and merging means for detecting that a new reconfiguring device is connected to at least one pair of previously unused data input and output links and for reconfiguring the ring to include the new device.

In this system, each reconfiguring device is provided with merging means so that the need for centralised control such as a special director device (which has been necessary in some previous proposals) is not required. In our invention ring control is decentralised with decision taking being distributed around the ring enabling much quicker reconfiguring to be achieved. Merging means is provided to enable the ring automatically to reconfigure to include a new device and one of the particular advantages of the invention is that the merging means enables an original ring to be reconstituted once a fault has been cleared.

The reconfiguring devices each have at least two pairs of data input and output links and in the simplest case are provided with primary data input and output links and auxiliary data and input and output links. Data is normally transmitted along the primary links and the auxiliary links enable the reconfiguring devices to have the ability to reconfigure the ring in which they are positioned. Commonly, these reconfiguring devices are called Type A Nodes. In the most general case such nodes are Star Points. One particular case of a Type A Node is a Wiring Concentrator which is directly attached to at most two other Type A Nodes. In addition, there may be a number of single link pair devices which are commonly called Type B Nodes which do not have the ability to reconfigure since they only have a single data input link and a single data output link. These may be positioned between some pairs of the reconfiguring devices or may be attached to a wiring concentrator. In normal use, data passing around the ring will also pass through the Type B Nodes and if a fault occurs in a section of the ring including Type B Nodes then the resulting reconfigured sub-ring will exclude at least some of these Type B Nodes. This is not usually significant since a majority of the original ring can still operate.

The type of fault which can be detected by the fault recovery means can be any form of abnormality in the ring such as a break in a link or break down of a device or simply the receipt of unrecognizable data.

Preferably, the system includes at least first and second reconfiguring devices each having primary and auxiliary output and input data links, the primary output data link of the first device being connected to the primary input data link of the second device and the auxiliary input data link of the first device being connected to the auxiliary output data link of the second device whereby data is normally transmitted from the first device to the second device along the primary links, the fault recovery means of the first device being arranged to transmit a "fault direct" message along the primary data links when a fault in the ring is sensed, the fault recovery means of the second device being arranged to transmit a "fault acknowledge" message to the first device along the auxiliary data links on receiving the "fault detect" message from the first device, the fault recovery means of the first device being responsive to the receipt of a "fault acknowledge" message to cause data to be transmitted between the first and second devices along the primary and auxiliary links.

The adaption of the fault recovery means in this way ensures that the occurrence of a fault can be dealt with very simply.

Preferably, a fault in the ring is sensed by detecting a break in the flow of data around the ring or a protocol violation. In some cases, a fault may be detected on the receipt of a certain message indicating that a device (Type A or Type B) has itself developed a fault.

The physical form of the messages which are transmitted between reconfiguring devices depends upon the choice of protocol used to transfer information around the ring. Various protocols have been proposed to achieve this which are known by the terms daisy chain, control token, message slot, and register insertion. An example of a slotted ring technique is that used in the Cambridge Network in which the entire ring is organised as a large shift register and data bits are shifted around the ring at speeds of approximately 10M Bits/s. Another method by which messages may be transmitted is by the process of "out of band signalling". In this system, normally data is transmitted around the ring at a rate of about 10 MHz. Messages can be transmitted at for example 1 MHz.

A particularly useful method for transmitting messages and data is the token ring system and particularly a modified form of the protocol set out in the proposed IEEE 802.5 Local Area Network Standard.

A simple form of ring is known as a dual ring in which each reconfiguring device is connected to its immediately neighboring reconfiguring devices by both primary and auxiliary data links, whereby data is normally transmitted around the ring along the primary data links.

When a single fault develops in a dual ring, the ring can be reconfigured around the fault so that a majority of the devices can still communicate. With a dual rings since all the reconfiguring devices have primary and auxiliary data links any one of the devices can cause data to be transferred within it from a primary input data link to an auxiliary output data link so that the original ring is turned round to form a sub-ring.

A disadvantage of a dual ring is that once more than one fault occurs the integrity of the system can no longer be maintained.

In order that the integrity of the system can be maintained even in the presence of multiple faults, it is preferable to configure the network of links in a more complex topology, such that there are a number of additional, normally unused links between the reconfiguring devices. In normal use, of course, only a single pair of links is used by each reconfiguring devices one to receive data from an upstream device and one to transmit data to a downstream device. The additional links allow the reconfiguring devices to choose an alternative data path if a fault develops.

Preferably, the mergining means comprises join request message transmitting means for transmitting join request messages along normally unused output data links; sensing means for sensing join request messages received along input data links; join acknowledge message transmitting means for transmitting a joing acknowledge message along a selected previously unused output data link when a previously transmitted join request message is received; and merge detection means for sensing incoming join acknowledge messages and for determining from the sensed join acknowledge messages when a new ring has been found incorporating both the new reconfiguring device and the devices originally connected in a ring, the merge detection means being arranged to transmit a merge request message around the new ring to cause the reconfiguring devices thereafter to transmit data around the new ring. In operation, the merging means continuously attempts to modify the ring by transmitting join request messages and also listens for the receipt of join request messages indicating that a new device has been attached to it. The new device may itself form part of another ring so that the merging means enables two rings to be emerged together. Alternatively, the new device could be an end of a sub-ring which has been set up as a result of the development of a fault and in this way the original ring can be reconstituted automatically once the fault has been repaired.

Preferably, the merging means arranges for the other devices in the ring to be temporarily inhibited from merging prior to the transmission of the merged request message.

Thus the routing of the ring is only changed when it is determined that the existing ring cannot be used because of fault conditions. Because the routing decisions need only be made on detecting fault conditions they do not affect the speed of data transmission around the ring. The network can also take advantage of the known benefits of rings such as lack of buffering and fast positive acknowledgement of data and "deterministic" access to the network.

The fault recovery means and/or the merging means may be constituted by hardware but are conveniently provided at least partly by a suitably programmed micro-computer.

The physical connection between the reconfiguring devices may be formed by any convenient medium such as coaxial cable, twisted pair, fibre optic lines, radio links, or any combinations of these. The use of fibre optic lines is particularly advantageous in industrial applications since these are not adversely affected by electrical noise and similar effects. Each link may be provided by individual, unidirectional lines or by a common line if different wavelengths are used e.g. multi-mode fibre optic).

In accordance with a second aspect of the present invention, a method of operating a reconfiguring device forming part of a data transmission system comprising a plurality of such reconfiguring devices, each device having a plurality of input and output data links, the devices being connected in a ring whereby for each reconfiguring device data is received on one data input link and transferred to one data output link such that data may be passed between all the reconfiguring devices along the ring, comprises detecting the presence of a fault in the ring and exchanging fault messages with other reconfiguring devices to attempt to cause data to be transmitted around a sub-ring when a fault is detected, the sub-ring being constituted at least partially by one or more of the previously unused data links to enable a number of the reconfiguring devices to continue to communicate; and sensing when a new reconfiguring device is connected to at least one pair of previously unused data input and output links and exchanging messages with the other reconfiguring devices in the ring to attempt to reconfigure the ring to include the new reconfiguring device.

In some cases, the sub-ring which results from detecting faults and exchanging fault messages will be constituted by a single reconfiguring device.

Preferably, at leat two of the reconfiguring device are dual link devices, each having primary data input and output links and auxiliary data input and output links, the primary output and input data links being connected together and the auxiliary input and output data links being connected together respectively whereby data is normally transmitted from the one device to the other device along the primary links, the method comprising transmitting a fault detect message along the primary output link when a fault in the ring is sensed; transmitting a fault acknowledge message along the auxiliary output link when a fault detect message is received; sensing for the receipt of a fault acknowledge message; and (a) assuming the status of a Tail device if only a fault detect message is received, (b) assuming the status of a Head device if a fault was sensed and a fault acknowledge message is received, or (c) assuming the status of an Isolated device if a fault is sensed and a fault acknowledge message is not received.

A Head device is configured to receive data along its auxiliary data input link and to transmit data along its primary data output link. Conversely, a Tail device receives data along its primary input link and transmits data along its auxiliary data output link.

When the data transmission system comprises at least three dual link reconfiguring devices, a dual link reconfiguring device assumes the status of Body device if it has transmitted a fault detect message and has received a fault acknowledge message.

When a reconfiguring device constitutes a Body device it arranges for its auxiliary input and output links and its primary data input and output links respectively to be connected together so that data is passed in one direction through the Body device along the primary input and output data links and in the other direction through the auxiliary input and output data links.

This reconfiguration after a fault is achieved much more quickly than in prior art systems because of the distributed decision taking capability of our invention.

It should be understood that the definition of a device as a "reconfiguring device" relates to its ability actively to participate in the reconfiguring of a ring.

In one example, a method for operating two reconfiguring devices connected together by a pair of previously unused uni-directional data links such that data can be exchanged between the two devices, comprises for each reconfiguring device continuously transmitting join request messages along all previously unused output data links; sensing for the receipt of a join request message; transmitting a join acknowledge message when a join request message is received; sensing for the receipt of a join acknowledge message transmitted from the other reconfiguring device; transmitting a merge request message when a join acknowledge message has been received; and thereafter causing data to flow between the two devices along the uni-directional links.

This method represents the simplest situation and is known as "Link Pair Merging". It is particularly simple and easy to implement since only a single Medium Access Control (MAC) layer is required in the control entity of each reconfiguring device. The MAC layer is that portion of the device which controls and mediates the access to the ring. Alternatively, messages could be sent via RS232 interfaces or the like.

In another example, a method for operating reconfiguring device one of which is connected by respective previously unused single uni-directional links with a pair of reconfiguring devices connected together in a ring, comprises for each device (a) transmitting join request messages along each previously unused output data link;

(b) sensing for the receipt of join request messages and (i) if a received join request message has not previously been received broadcasting the join request message to any other reconfiguring devices within the same ring, the join request message being modified to indicate that it has been received and transmitted by the transmitting device, or (ii) if the received join request message has previously been received then transmitting a join acknowledge message along the data output link along which the previously transmitted join request message had been sent;

(c) sensing for the receipt of a join acknowledge message;

(d) determining whether a received join acknowledge message has previously been received and, (i) if it has not then transmitting the received join acknowledge message to other stations in the ring, or, (ii) if it has been previously received, transmitting a merge request message along the data output link which has previously been identified; and (e) causing data subsequently to be transferred from the input data link to the output data link along which the merge request message has travelled.

This method known as "Single Link Merging" has the ability to merge any set of networks that can be merged unlike the link pair method mentioned above. In some cases, however, where there are link faults giving rise to two or more mutually exclusive sub-rings in which some devices are left out it may be necessary, in order to avoid continuous merging, to check that a merge is desirable before proceeding with step (d)(ii). Single link merging requires more intelligence than does link pair merging and in particular it requires a MAC layer for each pair of data input and output links.

In both link pair merging and single link merging as outlined above, it is preferable, prior to the transmission of a merge request message, to inhibit temporarily the other devices in the new ring from merging while the merge request message is transmitted around the new ring.

As may be realized, the reconfiguring devices which are connected together by previously unused uni-directional links may comprise Head and Tail devices of a sub-ring. This enables a sub-ring which has been formed as a result of a fault to be reconfigured into its original ring.

BRIEF DESCRIPTION OF THE DRAWINGS

Some examples of data transmission systems and methods in accordance with the present invention will now be described with reference to the accompanying drawings, in which:

FIG. 9 is a standby monitor finite-state machine diagram; and,

FIG. 10 is an active monitor finite-state machine diagram.

DESCRIPTION OF THE PREFERRED EMBODIMENTS

Figure 1:
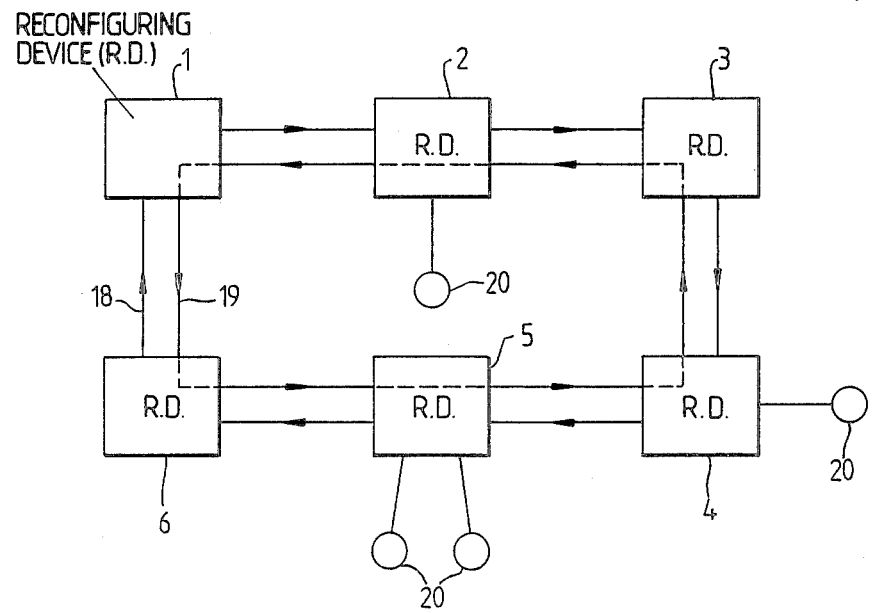
FIG. 1 is a block circuit diagram of a dual ring.

The invention may most easily be understood by considering the operation of a dual ring. Such a ring is illustrated in FIG. 1 and comprises six reconfiguring devices 1-6 connected in series in a ring. Such a ring may conveniently be used in the form of a local area network. Each device 1-6 in the ring has a similar form which is illustrated in more detail in FIG. 2. Each device has a control portion 7 which can be divided into four sections. Firstly, a physical (PHY) layer which receives and transmits data in bit form into the ring network. Secondly, a medium access control (MAC) sub-layer which controls the PHY layer to control and mediate access to the ring by the device. Thirdly, a network management (NMT) portion which provides the conceptual control element of the device and which interfaces with all the layers of the device and is responsible for the setting and resetting of control parameters, obtaining reports of error conditions, and determining if the device should be connected or disconnected from the medium. This will commonly be constituted by a microprocessor. Fourthly, a logical link control (LLC) layer which supports media independent data link functions and uses the services of the medium access control sub-layer to provide services to the network layer. These sections will be well known to persons skilled in the art. An example of the control portion is illustrated in the draft IEEE Standard 802.5 which is hereinafter referred to as 802.5 and is incorporated herein by reference.

For consistency of terminology with the terminology used in 802.5 the devices 1-6 will hereinafter be referred to as stations.

The control portion 7 is connected by four lines to a cross point switch 8 which is connected to a primary ring Receive (PRx) link 9, a Secondary ring Receive (SRx) link 10, a Primary ring Transmit (PTx) link 11, and a Secondary ring Transmit (STx) link 12. The four links connecting the control portion 7 with the cross point switch 8 are a Data channel Transmit (DTx) link 13, a Data channel Receive (DRx) link 14, an Idle channel Transmit (ITx) link 15, and an Idle channel Receive (IRx) link 16. The cross point switch 8 provides the ability to cross-connect any of the four signal sources to any of the four signal sinks. Not all possible switch settings are required and these will be set out in due course. Each of the links 9-12 is connected via respective trunk interface units 17 to the lines connecting adjacent stations.

The connecting lines may be formed from any convenient physical medium such as coaxial cable or fiber optic.

It will be understood from the above description that each station 1-6 is connected to is neighbors by two uni-directional rings. Firstly a primary ring comprising the primary ring receive links 9 and the primary ring transmit links 11 each of which is connected to the corresponding primary transmit links and primary receive links respectively of the adjacent stations, and a secondary ring formed by the secondary receive and transmit links 10, 12 of each station. The primary ring is indicated by reference numeral 18 and the secondary ring by reference numeral 19 in FIG. 1. Normally data is transmitted in one direction between the stations 1-6 along the primary ring 18. Thus, during normal transmission, data will pass between the devices in the order 1-2-3-4-5-6-1. If data is transmitted using the token method as set out in 802.5 then when a station gains access to the token it can enter data into a Frame which includes both the address of the station in question (Source Address) and the address of the destination station. This frame then passes along the primary ring 18 until it reaches the destination station where the information is copied by the destination station but the frame continues around the primary ring until it returns to the originating station. At that point, the originating station removes the frame from the ring and passes the token down to the next station. The secondary ring 19 allows data in certain circumstances to be transmitted in the other direction.

Some or all of the stations 1-6 are connected to data generating devices such as work stations or microcomputers and each station may be connected to a single such device or a plurality of such devices. For example, in FIG. 1 the stations 2, 4 are each connected to single devices 20 while the station 5 is connected to a pair of such devices.

It is important that the local area network shown in FIG. 1 can continue to be active despite the occurrence of a fault. For example, it can happen that the links between a pair of stations are severed. The case will now be considered where the links between the stations 1 and 2 are severed. This fault will be detected by the station 2 which will detect the cessation of data being received along the primary ring 18 and in particular along its primary ring receive link 9. The control portion 7 in response to detecting this fault will cause a "Fault Detect" frame to be transmitted along its PTx link 11. This will be received along the PRx link 9 of the station 3 and be passed to the control portion 7 of the station 3. The receipt of the Fault Detect frame will cause the control portion 7 of the station 3 to transmit a Fault Acknowledge frame along its STx 12 back to the station 2. The Fault Detect frame continues to pass around the primary ring 18 and thus passes through the stations, 4,5,6 until it reaches the station 1. Each of these stations when it receives a Fault Detect frame issues a Fault Acknowledge frame along its STx link 12 in a similar way to the station 3.

Each station then considers whether it has received Fault Detect and/or Fault Acknowledge frames and in this way the original ring can be reconfigured so that the six stations can still communicate with each other. If a station has received a Fault Detect frame and a Fault Acknowledge frame it knows that it has to be in the body (middle) of a sub-ring. It will be called a Body station and will use its primary links PRx and PTx 9, 11 for data transmission. In other words, the cross point switch 8 of each of these Body stations will connect DRx 14 with PRx 9 and DTx 13 with PTx 11 as in the normal case.

If a station which has received a Fault Detect frame does not receive a Fault Acknowledge frame (after a suitable timeout) it assumes the status of a Tail station at the end of a sub-ring. A Tail station uses its PRx 9 and STx 12 links for the data channel, hence turning the sub-ring around. That is, its DRx 14 is connected to its PRx 9 and its STx 12 is connected to its DTx 13.

If a station that detected the fault receives a Fault Acknowledge frame it assumes the status of a Head station. Head stations use the SRx 10 and PTx 11 for the data channel (ie. PTx 11 connected to DTx 13 and SRx 10 connected to DRx 14) and are responsible for initializing the new sub-ring by performing the initialization protocols required for the media access protocol such as initializing the slot structure (if a slotted ring).

If a node that detected a fault does not receive a Fault Acknowledge frame (after a suitable timeout), it assumes the status of an isolated station.

Figure 3:
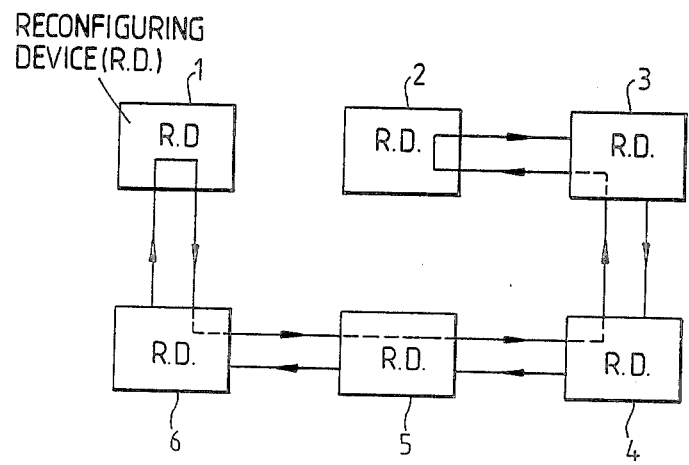
FIG. 3 is a block diagram of the dual ring shown in FIG. 1 after reconfiguring.

FIG. 3 illustrates the sub-ring which is formed after a break has occurred in the links between the stations 1, 2 in the ring shown in FIG. 1. In this example, the station 2 is the Head station and the station 1 is the Tail station while the stations 3-6 comprise Body stations. The route of data around the ring is thus in the order of stations 2-3-4-5-6-1 along what remains of the primary ring 18 and then 1-6-5-4-3-2 along the secondary ring, the stations on this return path simply acting as repeaters.

If a further fault arose in the sub-ring shown in FIG. 3 then full communication between all six stations would not be possible thereafter but the same procedure outlined above with the issue and detection of Fault Detect frames and Fault Acknowledge frames would enable at least some of the stations to reconfigure into further sub-rings so that at least some of them could still communicate. In this way, quick and automatic reconfiguration on the occurence of faults can be achieved.

It should be understood that when secondary or primary links are not used for data communication they will be connected to the respective idle channel receive and transmit links 15, 16 by the cross point switch 8.

It will be appreciated from FIG. 3 that the Head station 2 now has a pair of unused links 9,12 corresponding to its original PRx and STx links while the Tail station 1 also has two unused links 10, 11 corresponding to its PTx, and SRx links. The control portion 7 in each of these stations causes Join Request (JR) frames continuously to be transmitted along the unused transmit links. Thus, the Head station 2 will transmit JR frames along its STx 12 and the Tail station 1 will transmit JR frames along its PTx 11. If communication is reestablished between the Head and Tail stations 1, 2 of the same sub-ring then the control portion 7 in each station enables the normal full ring shown in FIG. 1 to be reinitialized. Reinitialization can either be achieved by the Head station 2 reconfiguring and reinitializing the network or by the Head station reconfiguring and some other system initialization protocol bringing the ring up.

The station responsible for reinitialization of a sub-ring is the Active Monitor. The active monitor of a sub-ring is always the Head station, in this case the station 2. During a ring initialization (INIT) where all stations are in their normal state, contention is used to obtain a unique active monitor which can be any of the stations in the network.

In the present example shown in FIG. 3, the Head station 2 will receive a JR frame from the Tail station 1 along its PRx link 9. In response to receiving this JR frame, the station 2 will transmit a Join Acknowledge frame (JA) along its STx 12. If the Tail station 1 receives a JA frame, it presumes the links between the two stations are operable and transmits a Merge Request (MR) frame along its PTx link 11. In addition, a break is sent along the sub-ring to force all nodes on the sub-ring to their Bypass node to enable the new (original) ring to be reinitialized as one ring. In this way, communication between the stations 1-6 returns to that shown in FIG. 1.

The Appendix at the end of this description sets out the modifications which need to be made to 802.5 to produce a token ring protocol which is able to carry out the fault recovery and merging steps described above. The steps set out in detail in the Appendix may be summarised as follows:

BYPASS

Initially after powerup or reset, a station is forced to Bypass (state 0 on the Standby FSM (FIG. 9)). While in this state, it may get an "insert" command from its management, this causes the station to insert itself onto the ring, synchronize its clock with the ring data and reset some timers that will be used in the next step. This event (INSERT) and these resulting actions are shown by the transition marked "01" which also shows that after all this the station is in a different state called Inserted (state 1)

CASE 1

The set of transitions will now be described, assuming that this station has just inserted itself onto a correctly operating ring. These will be transitions s13 and s22 (the "s" refers to the standby FSM FIG. 9, an "a" prefix refers to the active FSM—FIG. 10).

Transition s13 is caused by receiving an AMP frame (FR_AMP), AMP's are periodically transmitted by the Active Monitor indicating a good ring. This station queues a DAT frame, resets some timers and goes to Initialize. The DAT frame is addressed to this station and is transmitted then received to check that there is no other station on the ring with an identical address. If there is, transition s21 is taken and the station is reset to Bypass. Normally however transition s22 occurs and the station goes to Standby where it is on the ring and can transmit and receive data frames.

CASE 2

If a number of stations are INSERTed onto a previously dead but intact ring, then one of these will become an Active monitor by taking transitions s11, s33, a21, and a11. The reset will be Standby monitors after taking transitions s13, s22, or s11, s31, s13, s22.

Transition s11 occurs because the ring is dead and so BRK—DET is active. The station goes to state TX CL —TK where it continuously transmits Claim Token frames at which point BRK—DET goes inactive. Several stations could be doing this at once, stations which receive F—CL TK's with a higher address are forced out by transition s31. The station with the highest address will be left, this will become the active monitor after receiving its own FR—CL—TK and taking transition s33 to Tx Purge. This purges the ring of rubbish then takes transition a21 to Tx Fill. Finally transition a11 puts a token and an AMP frame onto the ring to initialize it and the station goes to Active where it is on the ring and can transmit and receive data frames.

Other stations which have been inhibited until now by the FR—CL—TK, see AMP and continue as for the first case via s13, s22.

CASE 3

If during normal operation, a break occurs on the ring, a BK—DET event will occur causing all stations to reset to Bypass. In this case, the stations will reconfigure around the break, one station will become the Head (Active) by transitions s01, s11, s32, s54, a21, a11. Other stations become Standby stations via s01, s13, s22. There will be one Tail station. This additionally does transition s15d, the reset are Bodies doing transition s15b.

Initially, the same steps as in Case 2 occur except that in TX CL—TK the BRK—DET will remain active for the station just below the break. This station which will become the Head takes transition s32 to Tx Beacon where it transmits Beacon frames and waits for Reconfiguration Acknowledge frame (FR—I RA) from downstream before taking s54 and becoming the Active monitor and initializing the ring.

All other stations downstream of the break are forced by the Head station beaconing to Inserted where stations switch to Tail or Body (see transition s15 table). The received beacons cause I—RA's to be transmitted back upstream (s15a) if these are received by an upstream station it switches to Body (s15B). The bottom station will not get a F—I—R—A and switches to Tail via transition s15D. The Tail and Bodies then wait for the Head stations to initialize the ring before taking s13, s22 to Standby.

MERGES

While a sub-ring is operating normally, the Head and Tail stations use their idle upstream or downstream links to attempt merges.

The Tail periodically sends Join Request frames (I—JR, transition s42L), if this is received by the Head it sends a Join Acknowledge back to the Tail (I—JA, transition a01G). If the Tail receives this it presumes the links are operable so a Merge Request is sent and a break is sent on the sub-ring (I—MR, transition s43). The Head on receiving the I—MR also sends a break via transition a05. All stations on both sub-rings are forced to Bypass by the breaks and are now reinitialized as one ring or sub-ring as in Cases 2 or 3.

ISOLATED

If a Head station in case 3 above finds that it gets no I—RA it takes transition s55 to Isolated instead of s54. In this state it uses the downstream idle links like a Tail and the upstream links like a Head in an attempt to merge.

As a Tail it transmits I—JR's, listens for an I—JA in which case it transmits a I—MA and reinitializes from Bypass (transitions s61, s62). As a Head if it receives a I—JR's it transmits an I—JA (transition s63), if it receives a I—MR it also reinitialises from Bypass (transition s64).

The methods used to merge Head and Tail stations of a sub-ring can be extended to the more general cases of merging previously separate networks. Two such situations will be described in detail.

Figure 4:
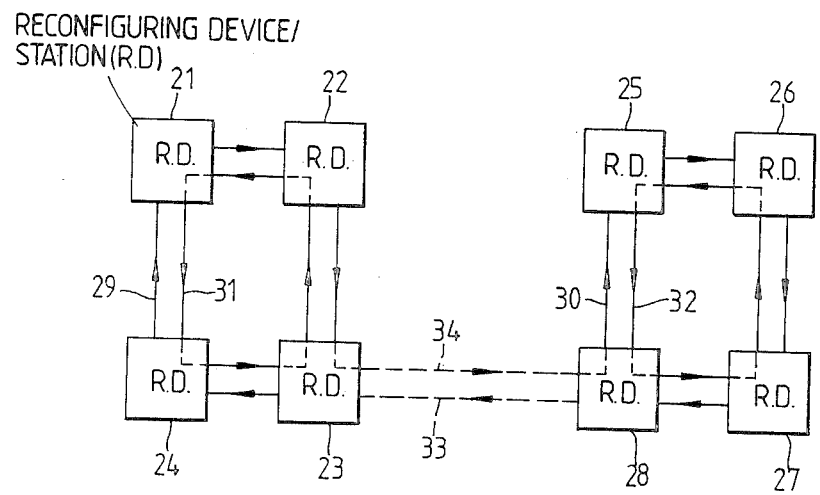
FIG. 4 illustrates the merging of two dual rings.

FIG. 4 illustrates two dual ring arrangements, for example local area networks, which are to be merged. One dual ring network has four reconfiguring stations 21–24 and the other four reconfiguring stations 25–28. The rings are to be merged via the stations 23, 28. It will be appreciated that at least the stations 23, 28 are slightly different from the station illustrated in FIG. 2 since each of these stations has an auxiliary pair of secondary receive and transmit links. This will require a modified form of cross point switch 8, the form of which will be readily determined by a person skilled in the art. In their unconnected form, each dual ring transmits data amongst its four stations in a serial manner similar to that shown in FIG. 1 and each has a primary ring 29, 30 for normally transmitting data in one direction and a secondary ring 31, 32 for transmitting data in the opposite direction if a fault occurs.

As in the FIG. 3 example, all stations which have unused transmit links (including the stations 23, 28) continuously transmit JR frames along those links. When communication is achieved between the stations 23, 28 along lines 33, 34 which are uni-directional and allow communication in opposite directions, the station 23 will receive JR frames from the station 28 and the station 28 will receive JR frames from the station 23 along the link 34.

If either station receives a JR frame their respective control portions 7 cause a JA frame to be continuously returned. Thus, when the station 28 receives the JR frame from the station 23 it will transmit a JA frame along the link 33 to the station 23. If a continuous JA frame is received, the processor or control entity is informed that there is a functional auxiliary link to another station. The control entity then attaches itself to the auxiliary link pair connected to the links 33, 34 and attempts to exchange messages in order to ascertain the address of the other station (station 28).

Once the address of the other station has been ascertained, the control entity then establishes that station is not on its own ring. This can most simply be achieved by attempting to transmit a message to that station around its own ring. Thus, the station 23 could try to transmit a message to the station 28 around its primary ring 29. Clearly, this will not succeed. If it discovers that the station is on its own ring already then no further action is taken. Otherwise, other merges are temporarily inhibited and MR frames are exchanged between the stations 23, 28. It is necessary to determine at this stage which station will be the "left" and which the "right" of the sub-ring merge. This can be done conveniently by having the one with the numerically lowest address being the "left" or alternatively, by having any other boolean function of the two addresses such that f(x,y)=NOT f(y,x), or by designating in each duplex link one channel as "preferred" and by selecting the "left" station as the station which was transmitting down the preferred channel or by reference to the time sequence of communication above or by using an anti-symmetric function of some combination of the stations address and a random number chosen independently by each station, or by some other means.

It is convenient that the two stations 23, 28 should exchange messages asymmetrically such as for example one station sending a "sub-ring merge Right" frame and the other a "sub-ring merge Left" frame.

Each station now broadcasts a "ring reconfiguration request" to its sub-ring. This informs all stations that a sub-ring reconfiguration is going to take place. It also inhibits any other station on the sub-ring from initiating a similar reconfiguration.

At this point, each station except the two stations involved 23, 28 in the merger will leave their connections intact and await the synchronization pulses to cause the ring communication to reestablish itself. Station 23 then connects its PRx with the STx associated with the line 34 to establish a relay connection while the line 33 is connected to a SRx which in turn is connected to the PTx. Similarly, the station 28 establishes a relay between the link 34 and the link to the station 25 and connects its PRx with the STx connected to the line 33.

It should be understood that JR and JA frames are simultaneously transmitted in both directions between the stations 23, 28 although the above description has, for simplicity, only referred to the action of the station 23 on receiving a JA frame. Similar action is taken by the station 28.

The communication path of the resultant merged network shown in FIG. 4 is as follows:

21-22-23-28-25-26-27-28-23-24-21.

Link pair merging is simple and easy to implement since only a single MAC layer is required in the control entity of each station 23, 28.

Figure 5:
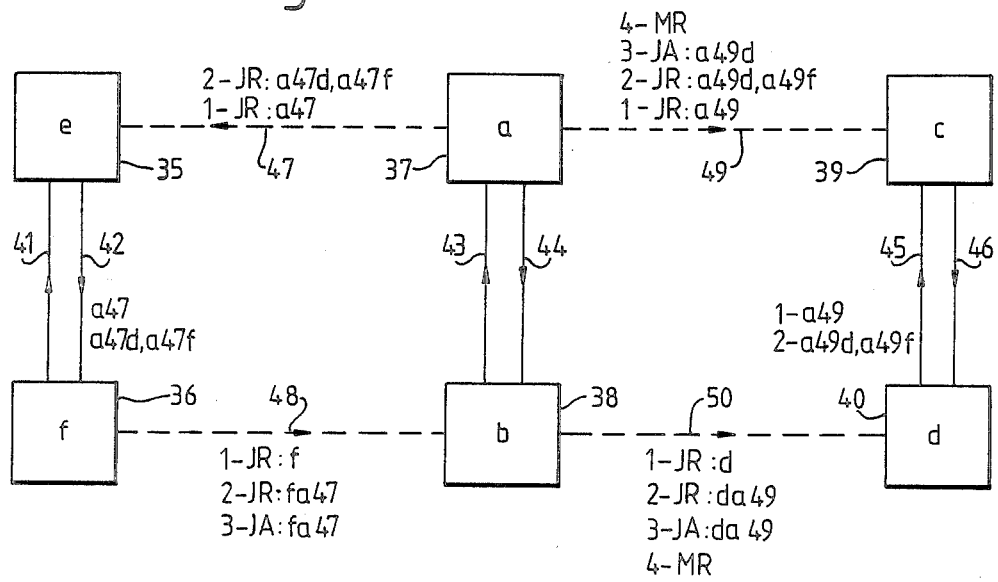
FIG. 5 illustrates the single link merging.

A more generalized merging arrangement using the principles outlined above is known as single link merging. This is illustrated in FIG. 5. Three networks are illustrated each consisting of two reconfiguring devices or stations 35, 36; 37,38; and 39,40 having addresses a-f respectively. Each pair of stations is connected via uni-directional links enabling data communication in opposite directions 41,46.

Figure 2:
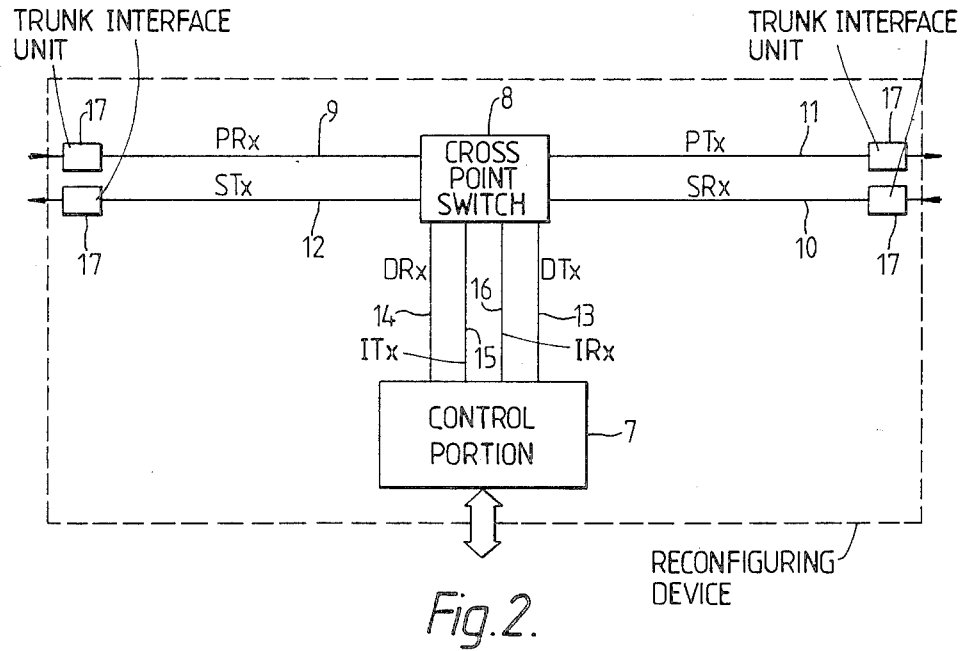
FIG. 2 is a block diagram of a reconfiguring device shown in FIG. 1.

Once again, each station 35-40 has a form similar to that shown in FIG. 2 but with an additional pair of auxiliary receive and transmit links. In this example, however, the station 37 will be connected via its auxiliary transmit link along a link 47 to an auxiliary receive link of the station 35. Similarly, the station 36 will be connected via an auxiliary transmit link along a line 48 to an auxiliary receive link of the station 38. Similar connections will be achieved between the stations 37 and 39 and the stations 40, 38 along uni-directional links 49, 50.

The following symmetrical events occur. As in the previous cases JR frames are continuously transmitted along each unconnected transmit link including the auxiliary transmit links described above. These JR messages initially consist only of the transmitting stations address and the link number of the auxiliary link concerned. This latter piece of information is important since any particular station, for example the station 37, may be sending JR frames down several auxiliary links at the same time.

If a station receives a JR message it broadcasts the received message to each other station within the same network and the station's address is appended to each JR message transmitted. This builds up a list of possible address/link paths within the networks. If a station gets a JR frame and finds its own address within it, it does not transmit this down the auxiliary link but realizes instead that this station is on a mergable path. The link number identifies the auxiliary transmit link that is to be used and a JA frame with the address/link path is sent down this link. There may be more than one possible merge path at a station, and the addresses and/or link numbers can conveniently be used to establish the priority merge path.

Received JA frames are broadcast to other stations within the network. A station which transmits JA frames and which gets a matching JA frame from the other network knows that a merge path has been agreed.

At this point, other stations are temporarily inhibited from merging and a MR frame is transmitted down the auxiliary transmit link on the merge path, causing the other station to switch the auxiliary receive link along which it has just received the MR frame into the data path on its network. If necessary, a merge with several networks can be done by one station simultaneously. The frames transmitted and received by the stations 35, 40 at various steps are illustrated in FIG. 5. In FIG. 5 there are two contending networks 35, 36 and 39, 40 trying to merge with the network 37, 38. Steps 1 and 2 show the JR frames being transmitted along each auxiliary link. These are broadcast around the respective networks 35, 36; 39, 40 and retransmitted to build up the merge paths. At step 3, the stations 36, 40 see their own address in the received JR frames and thus transmit JA frames. The station 37 has two merge paths and in this example it chooses the da39 path and transmits JA frames along the link 49. In step 4, the stations 37, 40 have now received matching JR frames and merge the ring by transmitting MR frames. Once this merge has been completed the stations 35, 36 are merged with the stations 37, 38 in a similar way.

Single link merging has the ability to merge any set of networks that can be merged, unlike the link pair method described above. However, there may be cases where there are link faults giving rise to two or more mutually exclusive sets of topologies in which some stations are left out. To avoid continuous merging it is necessary in step 3 above to check that a merge is desirable before proceeding with step 4. Single link merging requires more intelligence than link pair merging, and in particular it requires a MAC layer for each auxiliary link pair.

With both methods of merging described above, there can be problems with the technicalities of actually merging two rings together after the MR frame is issued without causing major disruption of the rings. A particular problem is the synchronization of the two ring clocks and the forcing off the ring of one of the two active monitors. This can be done conveniently by choosing a particular MR sequence and the use of a single latency buffer on each station. The MR sequence causes the station which receives it to use this as its data source and to feed this onto the ring. This should be done through a latency buffer in order to accommodate the differing frequencies of the two rings. The MR sequence itself should cause the rings to be cleared and the active monitors to go into contention for control of the resulting single ring. Once the rings are synchronized and the unique active monitor established, the latency buffers can be removed and normal data transfer can continue.

Figure 7:
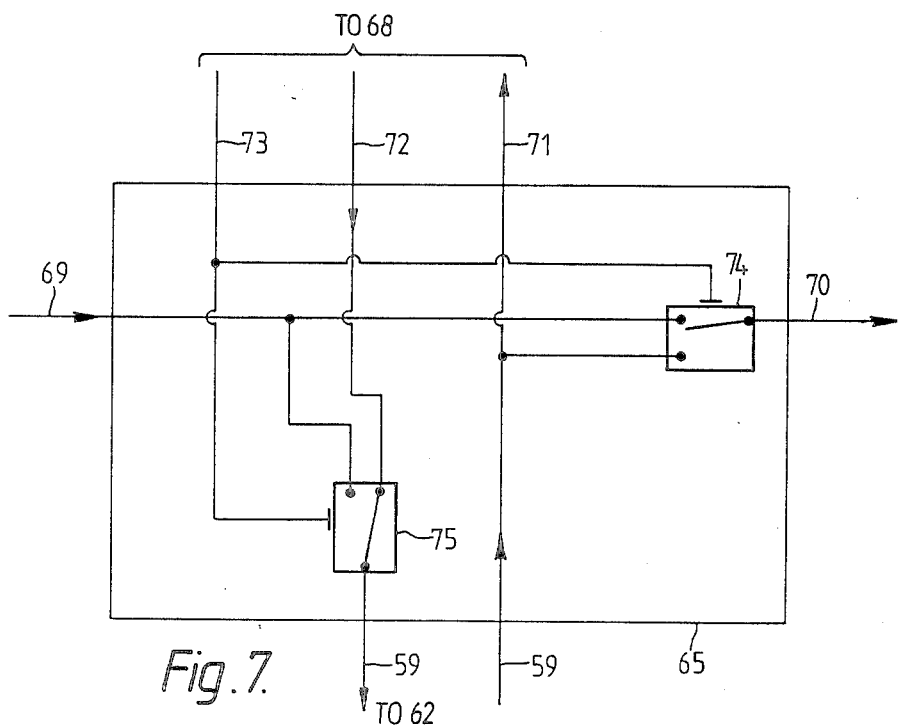
FIG. 7 is a block diagram of a bypass switch of the wiring concentrator shown in FIG. 6.
Figure 6:
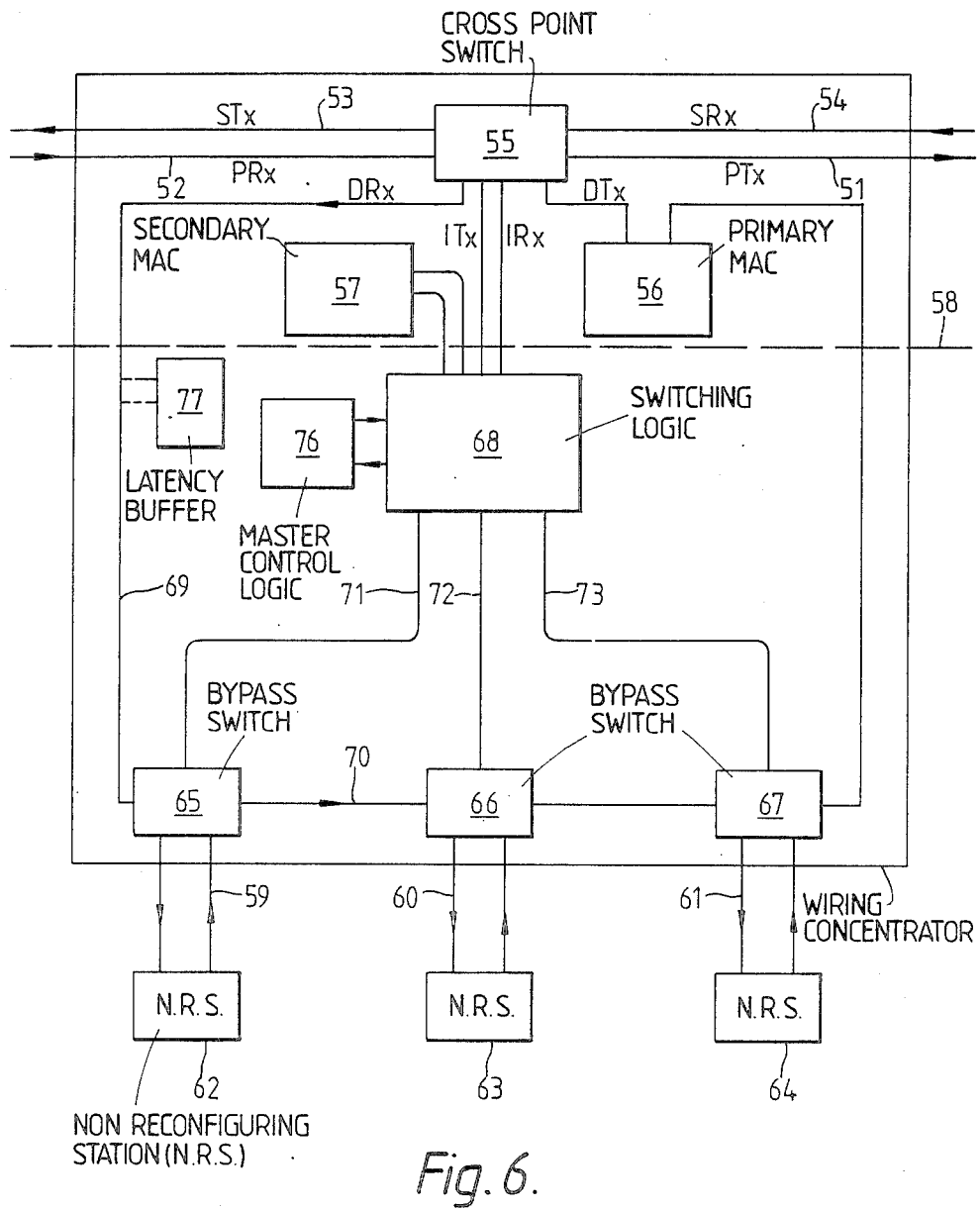
FIG. 6 is a block diagram of a wiring concentrator.

The rings described so far have all involved stations having a similar form and the ability to reconfigure. It should be understood that there may be additional non-reconfiguring stations positioned between some or all of the reconfiguring stations previously described in the form of chains in a known manner. These non-reconfiguring stations (often known as Type B stations) have only a single link pair for receiving and transmitting data and thus are incapable of any reconfiguration. In addition, some or all of the stations previously described could comprise wiring concentrators which have one or more non-reconfiguring stations on a single ring spur. An example of a wiring concentrator is illustrated in FIGS. 6 and 7.

The wiring concentrator has two pairs of transmit and receive links 51–54 the connections between which are controlled by a cross point switch 55. The cross point switch 55 is controlled in a similar way to the switch 8 described above to switch signals to a primary MAC 56 and a secondary MAC 57 which together form the control portion 7 in FIG. 2. Thus, the components above the line 58 in FIG. 6 are essentially identical to those described in FIG. 2.

The wiring concentrator has three sets of link pairs 59–61 to enable it to be connected to non-reconfiguring stations 62–64. Each of the link pairs 59–61 pass through respective bypass switches 65–67 which are controlled through switching logic 68 in such a way that each bypass switch can be in one of two modes (see FIG. 7).

In an INSERTED mode, an input line 69 is connected to the output line of the pair of lines 59 while the input line of the pair of lines 59 is connected to output lines 70,71.

In the Bypassed Mode, the input line 69 is connected to the output line 70 while an input line 72 from the logic 68 is connected to the output line of the pair 59, the input line of the pair 59 being connected to the output line 71.

The bypass switch 65 is controlled by a signal on a line 73 from the logic 68, the line 73 being connected to a pair of relays 74, 75.

The output line 70 from the bypass switch 75 is connected to the bypass switch 66 which is in turn connected to the bypass switch 67 whose output is connected to the primary MAC 56.

Th incoming data on the link 52 is passed via cross point switch 55 through the bypass units 65–67 and, when they are inserted, along their link pairs 59–61 respectively, through the primary MAC 56 and thence back to the cross point switch 55. Under normal operation the data is then transmitted out along the link 51 to the next reconfiguring device. The data on the line 54 is normally directed by the cross point switch 55 to the link 53.

The switching logic 68 is able to pass data to and from the secondary MAC 57 and is controlled by master control logic 76.

In some cases it may also be convenient to have inserted a latency buffer 77 in the internal ring 55, 65, 66, 67, 56, 55. This is a well known device which enables an incoming data signal to be buffered and retransmitted using a different clock which has nominally the same frequency but is not necessarily in phase with or at quite the same frequency of the incoming clock. The latency buffer 77 allows for a number of bits to be stored to compensate for the fact that the number of bits coming in is not the same as the number of bits that have been transmitted.

The wiring concentrator enables one or more of the stations 62–64 to be switched into the overall ring so that the ring effectively includes the inserted non-reconfiguring stations.

The purpose of the wiring concentrator is to allow the non-reconfiguring stations 62–64 to participate in a reconfiguring ring and to bypass any of these stations which appear to it to have failed. As far as the other stations on the ring are concerned the wiring concentrator behaves as though it were a simple reconfiguring station with two link pairs as previously described.

One of the difficulties with a wiring concentrator is that when it is switching in or out its dependents, other reconfiguring devices in the ring may think a fault has developed and reconfigure around the wiring concentrator. This problem is overcome as is explained in the following description of the operation of the control logic.

a. On initialization it first sets all the bypass relays 65–67 to bypass and participates in bringing up the ring as though it were a simple Type A node.

b. The secondary MAC 57 then tests each of the dependents 62–64 in turn by attempting to bring up a ring with each of them. It notes the station address of any nodes which it can talk to on each dependent port, and which ports were successful (ie had some nodes with which a ring could be brought up).

Note that in the embodiment described we need to keep track of which type A nodes are connected to the Auxiliary Ports 51–54. This can conveniently be done in an 802.5 ring as follows:

(i) Transmit a BCN Beacon frame along the dependent ring to stop any beaconing stations.

(ii) Transmit an AMP Active Monitor Present frame which will push the next node into Standby Monitor State.

(iii) Transmit a Token. The next node which has not already transmitted a SMP (Standby Monitor Present) frame will send one.

(iv) Note the address of the SMP frame received if any, and if one is received and there is another downstream station on the ring (indicated by the A bits being Set) then repeat step (iii) above.

Other ring protocols will normally have similar methods of determining the membership of the ring.

Note that it would be possible to have somewhat similar protocols which did not rely on knowing the membership of dependent rings, as discussed under (d) below.

c. When all the dependent ports have been tested and any successful ports have been found then the control logic will attempt to bring up the ring with those ports which were successful *inserted* into the ring. This can be accomplished in a number of ways:

(i) The bypass relays for the successful ports can be set to inserted. This will cause a 'glitch' on the ring, bringing it down and then starting it up in accordance with the 802.5 protocols.

(ii) The ring can be deliberately broken, the bypass relays for the successful ports can be inserted, and then the ring brought up.
(iii) As above, but with a message sent first along the ring informing the other members of the ring that this is going to happen.
(iv) Given a suitable mechanism in the logic 68 and in the latency buffer 77 it may be possible for the successful ports to be brought into a state where all their clocks are synchronised and then brought smoothly into the main ring.

All these alternatives and other similar ones are essentially equivalent. Their selection in a practical design would be based on engineering considerations such as:
cI. Reliability of the switching mechanism.
cII. The desirability of ensurng that the full ring comes up cleanly on initialization. If several of these wiring concentrators were performing this operation simultaneously then there would be the inconvenience of the ring being repeatedly formed and re-formed.
cIII. The importance of minimizing disruption to the ring.

Conveniently cII can be met by having a time constant in the control logic
TC_DI— (Time Constant Dependent Initialize)

When the initial ring is brought up in (a) above a timer is set and no attempt is made to bring down and initialize the ring until this timer reaches TC_DI. In the meantime the testing logic continues to test the dependent nodes. TC_DI should be chosen so that the substantial majority of the nodes on the ring will have had time to test their dependents before TC_DI expires. If we then require that any nodes that have not completed testing their dependents wait a further TC_DI before attempting to bring them in, we have reduced the number of times the ring is brought down to the smallest integer not less than:

Longest time for any node to test all its dependents TC_DI d. If a node or link fails, this will be indicated by its downstream neighbor producing a beacon and/or by it no longer transmitting a signal with appropriate physical characteristics. The most salient of these physical characteristics is the clock. Others may include the presence of static energizing signals (as in the presently specified dual twisted pair interface in 802.5) and the absence of major physical coding violations.

The switching logic 68 conveniently has detectors which signal to the control logic 76 the presence of clock and other appropriate physical characteristics on any of the lines. This mechanism can equally well be located in the Bypass Units 65–67 with appropriate signals to the control logic. The cases of a beacon and of physical characteristic failure can be considered separately:

dI. If a Physical Characteristic Failure is detected from any dependent then this dependent is bypassed by means of the bypass unit. The other cases below only apply if no Physical Characteristic failure is detected.

Note that the level of physical characteristic checking could vary n different embodiments of the invention. In particular it might be acceptable to dispense with the identification of faulty beaconing stations and simply use physical characteristics, with a drastic mechanism such as removing all dependents if an unidentified beacon source emerged.

dII. If a beacon is broadcast by any dependent other than the first one (controlled by bypass 65) then it will be detected by the main MAC 56. The control unit can identify which port is responsible because it discovers which addresses are on which ports when it switched them in (see a above and e below).

There remains the problem in some networks of nodes being added to dependent rings after they have been initialized. This is conveniently dealt with by:
(i) Re-checking any dependent ring on which even transient physical disturbances have been identified.
(ii) Periodically discovering the contents of the dependent rings, for example in 802.5 by discovering the UNA (Upstream Neighbor Address) of each of the known dependents, and if it differs from that expected the new node's UNA etc..

The fault probably lies in the node upstream of the node which generated the beacon, or in the beaconing node itself. In either case the preferred embodiment of the invention is to bypass the port from which the beacon is coming and if the upstream neighbor of that node is on a different port (ie the node is the first active node in that port) the port immediately upstream. The port(s) disconnected are then checked (see e below) and brought back into the ring if and when they are functioning.

dIII. If the beacon comes from the first active node of the first port then the fault may lie with the rest of the ring upstream of the wiring concentrator. In the first instance the port that generates the beacon should be bypassed, and if the beacon persists then the noe should assume that the cause of the beacon lies upstream of it and reconfigure as in (f) below.

dIV. If the beacon is generated by the main MAC then the port immediately upstream of the main MAC will be bypassed.

By the means described above it will be possible to generate and keep a working ring in the presence of faults or disconnections. It remains to describe how dependent nodes can be added to the ring when they are found to be functional.

The secondary MAC 57 when not required for other work (as per the reconfiguration mechanisms described earlier) will cycle through each of the dependent ports that are bypassed, attempting to bring up a ring with them. If it succeeds then the ring is brought down and the successful port inserted. If a clock signal is newly detected from a port then the secondary MAC tries that port first. In this way nodes that are newly connected to the wiring concentrator are tested more quickly.

f. If the required node determines that a full ring reconfiguration is required, then there are two options:
fI. The simplest is to bypass all the dependent nodes, bring up the ring as described earlier, and then bring in the dependent ports as described in (a) above.
fII. Alternatively, it can attempt to keep the nodes which are inserted in the new ring, and perform the reconfiguration protocols with the dependent nodes inserted. In that case it needs to treat beaconing events from the first port as indicating problems with the upstream wiring concentrator.

For practical reasons fI is the preferred embodiment. This is mainly because the dependent nodes may act in unpredictable ways since they may not be designed to cooperate with the reconfiguring nodes.

In other modifications, some of the stations may have a different number of input and output secondary links but in all these cases the reconfiguring stations will continuously transmit joining path frames along their non-ringing outputs and listen for the receipt of JR frames on their non-ringing inputs and JA frames on all their inputs.

Two forms of joining path have been described above but more generally a joining path may be considered to be composed principally of links which are not members of active sub-rings but which may incorporate one step backwards along a member of an active ring between any two links that are not members of active rings.

Figure 8:
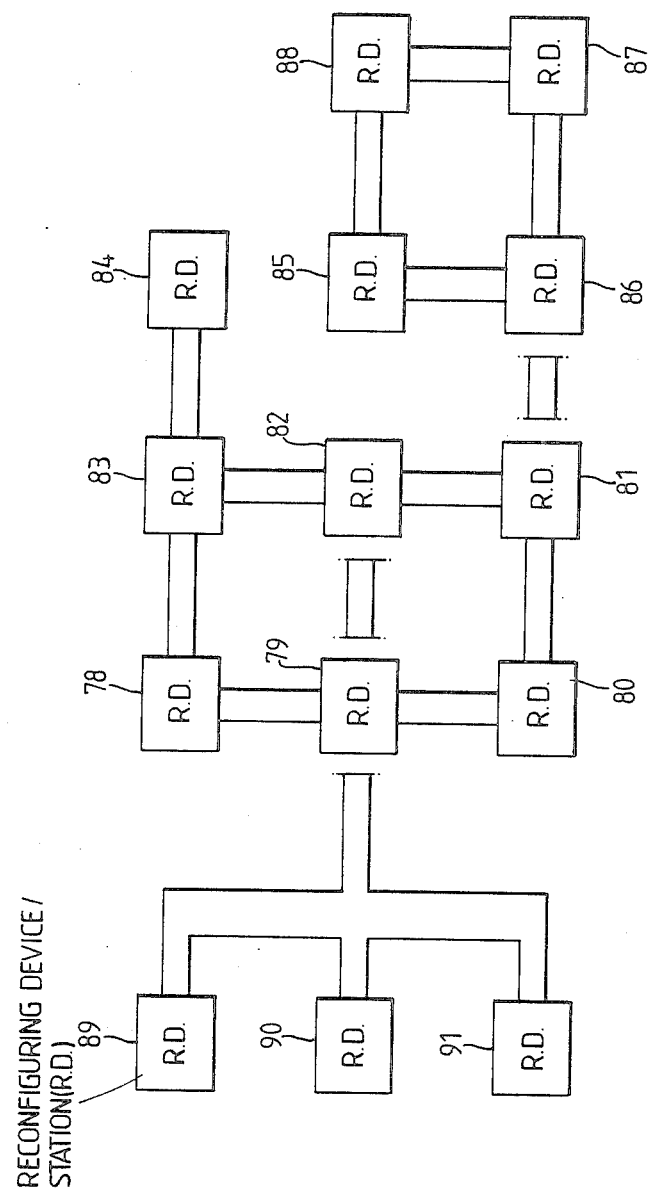
FIG. 8 illustrates an arbitrary topology.

It is possible to generalize the principles of the invention to enable more complex topologies to be reconfigured. An example of such a topology is illustrated in FIG. 8 where a number of stations are illustrated with the connecting lines representing the bi-directional link pairs. Auxiliary links are indicated by lines which are not joined to the boxes representing the stations. The stations 78-84 and 85-88 represent two backbone rings which are connected together by an auxiliary link pair between the stations 81 and 86. There is a redundant link between the stations 79 and 82. The station 84 is a single station single ring spur connected to the station 83 which is a wiring concentrator. Stations 89-91 are on a multiple station, single ring spur connected to the station 79 which is also a wiring concentrator. By making use of the redundant links and the other principles outlined above, reconfiguration of the this arbitrary network can be achieved.

APPENDIX

This Appendix describes modifications which should be made to the draft IEEE Standard 802.5 to achieve a dual ring protocol enabling our invention to be performed.

Sections 3.3.7–3.4.11 are to be added to the Standard, while Sections 4.2.3.1–4.2.4.3 replace original Sections 4.2.3.1–4.2.4.3. FIGS. 8 and 9 of the IEEE Standard are placed by FIGS. 9 and 10 of this application respectively.

Abbreviations and Mnemonics (as used in FSM description)

A = Address Recognized Bit
AMP = Active Monitor Present p0 BCN = Beacon
C = Frame Copied Bit
CL = Claim
DA = Destination Address
DAT = Duplicate Address Test
E = Error Detected Bit
ED = Ending Delimiter
EFS = End of Frame Sequence
FR = Frame
FS = Frame Status (Field)
I = Intermediate Frame Bit
M = Monitor Bit
MA = My (Station's) Address
NMT = Network Management
P = Priority (of the AC)
PDU = Protocol Data Unit
PM = PDU Priority
Pr = Last Priority Value Received
PRG = Purge
R = Reservation (of the AC)
Rr = Last Reservation Value Received
RUA = Received Upstream Neighbour's Address
SUA = Stored Upstream Neighbour's Address
SA = Source Address
SFS = Start of Frame Sequence
SMP = Standby Monitor Present
Sr = Highest Stacked Received Priority
Sx = Highest Stacked Transmitted Priority
TAM = Timer, Active Monitor
THT = Timer, Holding Token
TK = Token
TNT = Timer, No Token
TQP = Timer, Queue PDU
TRR = Timer, Return to Repeat
TSM = Timer, Standby Monitor
TVX = Timer, Valid Transmission
TS = Transmit.
TK(P=x,M=y,R=Z) = Token with P=x, M=y, and R=z
FR(P=x,M=y,R=Z) = Frame with P=x, M=y, and R=z
¬ = Boolean NOT
& = AND
V = OR
/ = the greater of

3.3.7 RECONFIGURE ACKNOWLEDGE FRAME (RA) (SECONDARY PATH)

This frame is transmitted by a stand-by monitor. It shall be transmitted when ever a BCN frame is received. Its reception indicates that a station exists downstream.

The RA values are as follows:
Pm: N/A
FC: 00 000000
DA: All stations, this ring
VI: X'000A (Reconfigure Acknowledge)

3.3.8 JOIN REQUEST FRAME (JR) (SECONDARY PATH)

This frame is transmitted by a TAIL station (or an isolated station). It shall be transmitted on expiry of time TIC in order to try and contact the downstream station.

The JR values are as follows:
Pm: N/A
FC: 00 000000
DA: All stations, this ring
VI: X'0009' (Join Request)

3.3.9 JOIN ACKNOWLEDGE FRAME (JA) (SECONDARY PATH)

This frame is transmitted by a HEAD station (or an isolated station). It shall be transmitted whenever a JR frame is correctly received.

The JA values are as follows:
Pm: N/A
FC: 00 000000
DA: All stations, this ring
VI: X'0008' (Join Acknowledge)

3.3.10 MERGE REQUEST FRAME (MR) (SECONDARY PATH)

This frame is transmitted by a Tail station (or an isolated station). It shall be transmitted whenever a JA frame is correctly received. It signifies that both paths between adjacent stations are functional.

The MR values are as follows:
Pm: N/A
FC:00 000000
DA: All stations, this ring
VI: X'000B' (Merge Request)

3.3.11 CHECK SECONDARY PATH FRAME (CHK) (SECONDARY PATH)

This frame is transmitted by a NORM station on expiry of a timer TIC. The reception of this frame shall reset the timer TIE. This signifies that the (otherwise) unused path between two adjacent stations is functional. If the timer TIE expires, then the secondary link is considered to have failed.

The CHK values are as follows:
Pm: N/A
FC: 00 000000
DA: All stations, this ring
VI: X'000C' (Check Secondary Path)

3.4.8 Timer, Idle Check (TIC)

Each station shall have a timer TIC, called an Idle Check timer. It is used by each station to assure the integrity of the secondary data path, and when the station is not in the body of a ring, it is used to re-establish communication between two sub-rings.

3.4.9 Timer, Idle check Expired (TIE)

Each station shall have a timer TIE, called an Idle check Expired timer. It is used by each station to assure the integrity of the secondary data path, and when the station is not in the body of a ring, it is used to re-establish communication between two sub-rings.

3.4.10 TIMER, WAIT FOR TAIL (TWT)

Each station shall have a timer TWT, called a Wait for Tail timer. It is used by each station during reconfiguration to determine if the station immediately downstream is active and if both links are operational. If the timer expires during reconfiguration before a RA frame is received, then the station becomes a Tail station.

3.4.11 TIMER, WAIT A BIT (TWB)

Each station shall have a timer TWB, called a Wait a Bit timer. It is used by the station that is about to become the head during reconfiguration. It is used to ensure that a reasonable number of Beacons are transmitted in the TX BEACON state before transition 54 takes place.

4.2.3.1 MASTER RESET

If the station is reset, NMT will be notified an transition will be made from its current state to Bypass state (State 0).

4.2.3.1a BREAK DETECT

If the station detects the break condition on the Data channel, then the effect shall be the same as MASTER RESET.

4.2.3.1b BEACON RECEPTION

If the station receives a BCN frame whose Source Address is not equal to My Address, then NMT is notified, timers TSM and TRR are reset, the latency buffer is removed and the switch set to BODY. An immediate transition is made to Inserted State (State 1). This event indicates that a ring reconfiguration is required and so this gets all the stations on the ring into a known state.

4.2.3.2 STATE 0: BYPASS

In this state the station is not inserted on the ring.
(01): Upon activation of the insertion logic (see MA CONTROL.request), timers TSM and TRR are reset and the station is entered onto the ring.

4.2.3.3 STATE 1 INSERTED

In this state the station synchronises its receive clock with the receive signal and then, having achieved synchronisation, awaits the receipt of an AMP frame. The station also performs the ring reconfiguration in this state if required.

(11): If an AMP is not received before timer TSM expires or if the BREAK condition exists on the ring, it is assumed that there is not active monitor in the ring, timer TNT and TRR are reset, NMT notified and transition is made to the Claiming Token state (state 3). Note that the Break condition is tested on Expiry of timer TRR, this is to allow the ring data decoder to be synchronized to the ring data (if any).

(12): (transition removed)

(13): If an AMP has been received a Duplicate Address Test (DAT) PDU is enqueued, timer TSM and TNT is reset and transition made to Initialise State (State 2)

(14): (no transition)

(15A): If a BCN is received the station knows that the ring is not complete and so must be reconfigured into sub-rings. The timer TWT is reset (which will determine if this station is at the tail of the sub-ring), the switch is set to NORM which then allows the station to transmit a Reconfiguration Acknowledge (RA) frame.

(15B): If a Reconfiguration Acknowledge is received, then this station cannot become the tail of a sub-ring. The switch is changed into BODY.

(15C): If a Claim Token is received, the reconfiguration is aborted. The switch is returned to the BODY state.

(15D): When TWT expires, the station can determine if it is in the BODY or if it is the TAIL of the sub-ring by examining the current switch setting. If the switch is at NORM, then no RA has been received so the station is now at the TAIL of the sub-ring—it switches into TAIL. This switch action will close the ring.

4.2.3.4 STATE 2 INITIALIZE

This state exists to detect the existence of a duplicate station address on the ring. This enhances the validity of later checks within the FSMs for SA=MA, etc. This is particularly useful in environments in which the station address assignments are not rigidly controlled.

(21): If the DAT MAC frame that was not transmitted by the station is not received before timer TSM has expired or if a DAT MAC frame which the station originated (DA=MA) is received with the Address Recognised bits not set to zero (A$\sim$=0) the station's network management (NMT) is notified and the station returned to the Bypass state (State 0).

(Note: NMT may determine if the station should retry insertion into the ring.)

(22): However, if the DAT MAC frame is returned indicating that there is not another station on the ring with the same address (A=0), an SMP protocol data unit (PDU) is enqueued, timers TNT, TSM, TIE and TIC are reset, and transition is made to Standby state (State 4).

(23): When TNT expires, the station will retransmit the DAT PDU and reset the timer TNT. This transition is to solve startup problems when frames can be discarded or lost.

4.2.3.5 STATE 3: TX CLAIM TOKEN

In this state, Claim Token MAC frames are continuously transmitted.

(31): If a Claim Token MAC frame is received in which the source address is greater than the station's address or a purge frame received, transition is made to Inserted state (State 1) after resetting timer TSM and changing the switch to BODY.

(32): However, if timer TNT expires or there is a break on the ring when timer TRR expires timers TSM and TWB are reset and transition made to the Beaconing state (State 5).

(33): Or, if the station receives a Claim Token with a source address equal to the station's address and Received Upstream Neighbor's Address (RUA) equal to the Stored Upstream Neighbor's Address (SUA), the bid for the active monitor has been won. The latency buffer shall be inserted into the ring, timer TNT reset, switch set to NORM (complete ring exists) and transition made to ACTIVE MONITOR Purge state (State 2).

4.2.3.6 STATE 4: STANDBY

In this state the monitor is in standby mode, monitoring the ring to ascertain that there is a properly operating device monitor on the ring. It does so by observing the tokens and AMP frames as they are repeated on the ring. If tokens and AMP frames are not periodically detected the standby monitor will timeout and initiate claiming token. If the station is the TAIL of a sub-ring, then it periodically tries to initiate a sub-ring merge. The state of the secondary link is also monitored if the station is a member of a complete sub-ring.

(41): If timers TNT or TSM expire, timers TNT and TRR are reset and transition made to Claiming Token state (State 3).

(42A): (transition removed)

(42B): If a Claiming Token frame, a Purge frame or a Token is received, timer TNT is reset.

(42C): If a Standby Monitor Present (SMP) frame whose A and C bits equal 0 is received, timer TQP shall be reset.

(42D): If an Active Monitor Present (AMP) frame whose A and C bits equal 0 is received, timers TQP and TSM shall be reset.

(42E): If an Active Monitor Present (AMP) frame whose A and C bits do not equal 0 is received, timer TSM shall be reset.

(42F): If timer TQP expires, an SMP PDU shall be enqueued for transmission.

(42G, J): If a Check Secondary frame is received, then the state of the switch is examined to determine the action taken. If the switch is in NORM (42G) then the station is in a complete ring and timer TIE is reset. If the switch is in BODY (42J) then the station was mistaken in believing that the ring had been reconfigured, so the switch is set to NORM and timers TIE and TIC are reset.

(42H, K, L): If timer TIC expires, then action is taken on the state of the switch. If the switch is in NORM (42H) then a Check Secondary frame is enqueued and timer TIC reset. If the switch is in state BODY (42K) then the event is ignored. If the switch is in state TAIL (42L) then a Join Request (JR) frame is transmitted to the downstream station and timer TIC is reset.

(42I, K, M): If timer TIE expires, then action is taken on the state of the switch. If the switch is in NORM (42I) then no Check Secondary has been received for some time and so the NMT is notified that the secondary link is broken and then timer TIE is reset. If the switch is in state BODY (42K) then the event is ignored. If the switch is in state TAIL (42M) then the event is also ignored.

(43): If a Join Acknowledge frame is received on the secondary channel, the station transmits a Merge Request, then sends a short period of BREAK round the ring and performs a transition to the Bypass state (State 0).

4.2.3.7 STATE 5 TX BCN (Transmit Beacon

This state is entered when a serious ring failure has occurred. MAC supervisory Beacon Frames will continue to be transmitted until Beacon MAC frames or Reconfiguration Acknowledge frames are received at which time:

(51): (transition removed)

(52): If a Beacon frame is received with SA equal to MA, then transition shall be made to Claiming Token state (State 3) after resetting timer TNT.

(53): (transition removed)

(54): If a Reconfiguration Acknowledge is received and timer TWB has expired, then the switch is set into HEAD state and a transition made to ACTIVE MONITOR TX Purge (active monitor State 2).

(55): If the timer TSM expires, then the station knows that it is isolated.

This is reported to the NMT and a transition is made to Isolated state (State 6).

4.2.3.8 STATE 6: ISOLATED

The station is in this state when neither a complete ring or sub-ring can be established. This means that the station has neither an upstream neighbour nor a downstream neighbour. In this state the station transmits Join Requests towards the downstream station. It also listens for Join Requests on the upstream channel.

(61): When timer TIC expires, a Join Request PDU is enqueued downstream and timer TIC is reset.

(62): When a Join Acknowledge PDU is received, a Merge Request PDU is transmitted downstream followed by the BREAK signal. The NMT is notified and transition is made to Bypass state (State 0).

(63): When a Join Request PDU is received, a Join Acknowledge PDU is transmitted upstream.

(64): When a Merge Request PDU is received, then the BREAK signal is sent, the NMT notified and transition is made to Bypass state (State 0).

4.2.4 Active Monitor Finite State Machine

The function of the active monitor is to recover from various error situations such as absence of validly-formed frames or tokens on the ring, a persistently circulating priority token, or a persistently circulating frame. In normal operation there is only one active monitor in a ring at any point in time. Timers TVX, TNT, TAM and TRR are used by the active monitor.

The active monitor shall utilize its own oscillator to provide timing for all symbols repeated or transmitted on the ring. The active monitor also supplies the latency buffer for the ring.

The operation of the active monitor is explained as follows:

4.2.4.1 STATE 0 ACTIVE

The active monitor is in this state when the ring is operating normally.

(01A): The M bit is set to one on a token whose M bit is zero and whose priority is greater than zero or a frame whose M bit is zero, and timer TVX is reset.

(01B): Receipt of a token whose M bit and priority are zero will cause timer TVX to be reset.

(01C): If timer TAM expires a Active Monitor Present PDU is enqueue and timer TAM reset without changing state.

(01D): If a Check Secondary frame is received and the switch is set to NORM, then the timer TIE is reset.

(01E): If timer TIC expires and the switch is set to NORM, then a Check Secondary frame is enqueued and the timer TIC is reset.

(01F): If timer TIE expires and the switch is set to NORM, then the NMT is notified that the secondary link is broken and the timer TIE is reset.

(01G): If a Join Request frame is received and this station is part of a sub-ring (i.e. switch is set to HEAD), then a Join Acknowledge frame is queued. This is part of the three way handshake to merge two sub-rings.

(02): If a frame or token which is being repeated has its M bit equal to 1, the frame or token is aborted, timer TNT is reset and transition made to Transmit Purge state (State 2).

(03): If timer TVX expires, timer TNT is reset, and transition made to Transmit Purge state (State 2).

(04): If the monitor station receives a Active Monitor Present frame with a source address that does not equal the station's address, a Purge frame, a Claim Token frame, or a Beacon frame, the latency buffer shall be deleted, timers TRR and TSM reset, and transition made to STANDBY MONITOR Inserted state (State 1).

(05): If a Merge Request frame is received, the latency buffer shall be deleted, the BREAK signal sent and a transition made to the STANDBY MONITOR Bypass state (State 0). This means that the three way handshake to merge two sub-rings has been completed and that the merge is now starting.

4.2.4.2 STATE 1: TX FILL (Transmit Fill)

This state exists to assure that all Purge frames have been stripped from the ring before transmitting a new token.

(11): When timer TRR expires a token is transmitted with M and R equal to zero. Timers TVX, TAM, TIC and TIE are reset and transition is made to Active state (State 0). The latency buffer is reset to the mid point.

4.2.4.3 STATE 2: TX PURGE (Transmit Purge)

In this state Purge MAC frames are continuously transmitted to purge the ring before transmitting a new token.

(21): If the station receives a Purge frame whose source address equals the station's address and the sub-vector equal to UNA, timer TRR is reset and transition is made to Transmit Fill state (State 1).

(22): If timer TNT expires while waiting for receipt of the station's source address, the latency buffer shall be deleted, timers TNT and TRR reset, and transition made to STANDBY MONITOR Transmit Claim Token state (State 3).

We claim:

1. A data transmission system comprising a plurality of reconfiguring devices, each device having a plurality of input and output data links, a selected number of the devices being connected to a ring whereby for each reconfiguring device, data is received on one data input link and transferred to one data output link such that data may be passed between all the reconfiguring devices along the ring, each said configuring device including means for detecting the presence of a fault in the ring, said means in different devices cooperating to attempt to cause data to be transmitted around a sub-ring when a fault is detected, the sub-ring being constituted at least partially by one or more of the previously unused data links to enable a number of the devices to continue to communicate; and means for merging for detecting that a new reconfiguring device is connected to at least one pair of previously unused data input and output links and for reconfiguring the ring to include the new device.

2. The system according to claim 1, wherein said plurality of devices includes at least first and second of said reconfiguring devices including a ring, each of said devices having primary and auxiliary output and input data links, the primary output data link of the first device being connected to the primary input data link of the second device and the auxiliary input data link of the first device being connected to the auxiliary output data link of the second device whereby data is normally transmitted from the first device to the second device along the primary links, said means for fault detection of the first device being arranged to transmit a "fault detect" message along the primary data links when a fault in the ring is sensed, said means for fault detection of the second device being arranged to transmit a "fault acknowledge" message to the first device along the auxiliary data links on receiving the "fault detect" message from the first device, the means for fault detection of the first device being responsive to the receipt of a "fault acknowledge" message to cause data to be transmitted between the first and second devices along the primary and auxiliary links.

3. The system according to claim 2, wherein one or more third reconfiguring devices are connected by the auxiliary and primary links between the first and second reconfiguring devices.

4. The system according to claim 1, wherein the means for merging include means for transmitting join request messages along normally unused output data links; means for sensing join request messages received along input data links; means for transmitting a join acknowledge message along a selected previously unused output data link when a previously transmitted join request message is received; and means for sensing incoming join acknowledge messages and for determining from the sensed join acknowledge messages when a new ring has been found incorporating both the new configuring device and the devices originally connected in a ring, the means for sensing being arranged to transmit a merge request message around the new ring to cause the reconfiguring devices thereafater to transmit data around the new ring.

5. The system according to claim 1, wherein each reconfiguring device is connected to its immediately neighboring reconfiguring devices by both primary and auxiliary data links, whereby data is normally transmitted around the ring along the primary data links.

6. The method of operating a reconfiguring device forming part of a data transmission system including a plurality of such reconfiguring devices, each device having a plurality of input and output data links, the devices being connected in a ring whereby for each reconfiguring device data is received on one data input link and transferred to one data output link such that data may be passed between all the reconfiguring devices along the ring, wherein the improvement comprises detecting the presence of a fault in the ring and exchanging fault messages with other reconfiguring devices to attempt to cause data to be transmitted around a sub-ring when a fault is detected, the sub-ring being constituted at least partially by one or more of the previously unused data links to enable a number of the reconfiguring devices to continue to communicate; and sensing when a new reconfiguring device is connected to at least one pair of previously unused data input and output links and exchanging messages with the other reconfiguring devices in the ring to attempt to reconfigure the ring to include the new reconfiguring device.

7. The method according to claim 6, wherein said plurality of devices includes at least two of said reconfiguring devices in said ring which are dual link devices, each having primary data input and output links and auxiliary data input and output links, the primary output and input data links being connected together and the auxiliary input and output data links being connected together respectively whereby data is normally transmitted from the one device to the other device along the primary links, including transmitting a fault detect message along the primary output link when a fault in the ring is sensed; transmitting a fault acknowledge message along the auxiliary output link when a fault detect message is received; sensing receipt of a fault acknowledge message; and (a) assuming the status of a Tail device if only a fault detect message is received, (b) assuming the status of a Head device if a fault was sensed and a fault acknowledge message is received, or (c) assuming the status of an Isolated device if a fault was sensed and a fault acknowledge message is not received.

8. The method according to claim 7, in which said plurality of devices forming said data transmission system includes at least three dual link reconfiguring devices, one of said dual link reconfiguring devices assuming the status of a Body device if it has transmitted a fault detect message and has received a fault acknowledge message.

9. The method according to claim 6 for operating two of said reconfiguring devices connected together by a pair of previously unused uni-directional data links such that data can be exchanged between the two devices, including for each reconfiguring device continuously transmitting join request messages along all previously unused output data links; sensing for the receipt of a join request message; transmitting a join acknowledge message when a join request message is received; sensing for the receipt of a join acknowledge message transmitted from the other reconfiguring device; transmitting a merge request message when a join acknowledge message has been received; and thereafter causing data to flow between the two devices along the uni-directional links.

10. The method according to claim 6 for operating said system of reconfiguring devices, one of which is connected by respective previously unused single uni-directional links with a pair of reconfiguring devices connected together in a ring, including for each device:

(a) transmitting join request messages along each previously unused output data link;

(b) sensing for the receipt of join request messages and (i) if a received join request message has not previously been received broadcasting the join request message to any other reconfiguring devices within the same ring, the join request message being modified to indicate that it has been received and transmitted by the transmitting device, or (ii) if the received join request message has previously been received, then transmitting a join acknowledge message along the data output link along which the previously transmitted join request message had been sent;

(c) sensing for the receipt of a join acknowledge message;

(d) determining whether a received join acknowledge message has previously been received and, (i) if it has not then transmitting the received join acknowledge message to other stations in the ring, or, (ii) if it has been previously received; transmitting a merge request messge along the data output link which has previously been identified; and (e) causing data subsequently to be transferred from the input data link to the output data link along which the merge request message has travelled.

11. The method according to claim 9, wherein each join request message transmitted by a reconfiguring device contains information indicating the address of the transmitting device.

12. The method according to claim 9, wherein at least some of said reconfiguring devices have more than two data output links, the join request message containing information indicating the data output link along which it is transmitted.

13. The method according to claims 9, wherein the reconfiguring devices connected together by previously unused uni-directional links include Head and Tail devices of a sub-ring.

14. A data transmission system comprising a plurality of reconfiguring devices, each device having two pairs of primary and auxiliary data links, the primary and auxiliary data links of each device being connected to respective primary and auxiliary data links of a downstream device and an upstream device whereby data is normally transmitted between devices along the primary links, and wherein each device includes fault recovery means for detecting the presence of a fault in the ring, the fault recovery means in different devices cooperating to attempt to cause data to be transmitted around a sub-ring when a fault is detected, the sub-ring being constituted at least partially by one or more of the previously unused data links to enable a number of the devices to continue to communicate, the fault recovery means of each device being arranged to transmit a "fault detect" message along the primary data links when it senses a fault in the ring, and to transmit a "fault acknowledge" message along the auxiliary data links on receiving a "fault detect" message whereby:

(i) if the fault recovery means of a device which detects a fault receives a "fault acknowledge" message on an auxiliary link it assumes the status of a Head device and causes data to be transmitted along said auxiliary link; and, (ii) if the fault recovery means of a device which received a "fault detect" message does not receive a "fault acknowledge" message after a predetermined period it assumes the status of a Tail device and causes data to be transmitted along the auxiliary link connected to the device from which it received the "fault detect" message.

15. A method of operating a reconfiguring device forming part of a data transmission system including a plurality of such reconfiguring devices, each device having two pairs of primary and auxiliary data links, the primary and auxiliary data links of each device being connected to respective primary and auxiliary data links of a downstream device and an upstream device whereby data is normally transmitted between devices along the primary links, comprising:

detecting the presence of a fault in the ring and transmitting a "fault detect" message along the primary data links, and transmitting a "fault acknowledge" message along the auxiliary data links on receiving a "fault detect" message, and (i) assuming the status of a Head device if a fault is detected and a "fault acknowledge" message is received on an auxiliary link so as to cause data to be transmitted along said auxiliary link; and, (ii) assuming the status of a Tail device if a "fault detect" message is received but a "fault acknowledge" message is not received after a predetermined period so as to cause data to be transmitted along the auxiliary link connected to the device from which it received the "fault detect" message.

* * * * *